(12) United States Patent
Bacallao

(10) Patent No.: US 10,173,708 B1
(45) Date of Patent: Jan. 8, 2019

(54) SHOPPING CART BAGGING STATION

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/053,248

(22) Filed: Aug. 2, 2018

Related U.S. Application Data

(60) Provisional application No. 62/546,850, filed on Aug. 17, 2017.

(51) Int. Cl.
 *B62B 3/14* (2006.01)

(52) U.S. Cl.
 CPC ................. *B62B 3/1464* (2013.01)

(58) Field of Classification Search
 CPC ....... B62B 3/1464; B62B 3/1472; B62B 5/00; B62B 2204/06; B65B 67/1216
 USPC .................... 224/411, 925; 248/690, 692, 95
 See application file for complete search history.

(56) References Cited

U.S. PATENT DOCUMENTS

| | | | |
|---|---|---|---|
| 259,932 A | 6/1882 | Sims | |
| 370,563 A | 9/1887 | Simmons | |
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |

(Continued)

FOREIGN PATENT DOCUMENTS

| | | |
|---|---|---|
| AU | 1142402 A1 | 4/2002 |
| AU | 2002364902 A1 | 5/2004 |

(Continued)

OTHER PUBLICATIONS

Search Report in GB Patent Application No. GB1713267.1, dated Dec. 22, 2017; 5 pages.

(Continued)

*Primary Examiner* — Corey N Skurdal
(74) *Attorney, Agent, or Firm* — Schmeiser, Olsen & Watts LLP

(57) ABSTRACT

Described is a shopping cart bagging station can be used by customers to bag their purchases as they shop. The disclosed shopping cart bagging station includes a box front portion and a back plate that couple together to form a rectangular enclosure for shopping bags. The box front portion has a bag holder hook inside the enclosure that shopping bags are hung from. An opening in the box front portion allows access to the shopping bags hanging from the bag holder hook. At least one cart coupling hook is coupled to the back plate to couple the shopping cart bagging station to a shopping cart. A customer hangs the shopping cart bagging station, with shopping bags hung from the bag holder hook, on the side of a shopping cart, and uses the shopping cart bagging station to provide shopping bags while they shop.

20 Claims, 12 Drawing Sheets

(56) References Cited

U.S. PATENT DOCUMENTS

| | | | |
|---|---|---|---|
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,284,579 A | 11/1918 | Brown | |
| 1,662,140 A | 3/1928 | Whitesides | |
| 2,240,629 A | 5/1941 | Smith | |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A * | 10/1969 | Girard | A47K 10/3836 |
| | | | 242/560 |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A * | 3/1983 | Cohen | B62B 3/1464 |
| | | | 224/411 |
| 4,403,807 A | 9/1983 | Wilkinson et al. | |
| 4,456,125 A | 6/1984 | Chap | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,702,402 A * | 10/1987 | Ferri | B62B 3/1428 |
| | | | 220/23.4 |
| 4,728,070 A | 3/1988 | Engelbrecht | |
| 4,838,504 A | 6/1989 | Bittenbinder | |
| D302,062 S | 7/1989 | Sable | |
| 4,881,577 A | 11/1989 | Stroh et al. | |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A | 3/1991 | Barteaux | |
| 5,002,215 A * | 3/1991 | Gregoire | B62B 3/1428 |
| | | | 206/425 |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,531,366 A | 7/1996 | Strom | |
| 5,533,361 A * | 7/1996 | Halpern | B62B 3/1464 |
| | | | 62/371 |
| 5,564,566 A * | 10/1996 | Lamb | B25H 3/00 |
| | | | 206/349 |
| 5,618,008 A | 4/1997 | Dearwester et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| D412,080 S | 7/1999 | Emery et al. | |
| 6,018,397 A | 1/2000 | Cloutier et al. | |
| 6,041,945 A | 3/2000 | Faraj | |
| 6,086,023 A * | 7/2000 | Kerr | B65B 67/1227 |
| | | | 248/100 |
| 6,109,462 A | 8/2000 | Emalfarb et al. | |
| 6,155,521 A | 12/2000 | O'hanlon | |
| 6,170,679 B1 | 1/2001 | Frye | |
| 6,193,265 B1 | 2/2001 | Yemini | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B1 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 | 4/2004 | Scola | |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B2 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B2 | 7/2006 | Giggle, III et al. | |
| 7,128,251 B1 | 10/2006 | Galle | |
| 7,172,092 B2 | 2/2007 | Yang et al. | |
| 7,177,820 B2 | 2/2007 | Mcintyre et al. | |
| 7,182,210 B2 | 2/2007 | Metcalf | |
| 7,192,035 B1 | 3/2007 | Lioce | |
| D540,591 S | 4/2007 | Snell | |
| 7,222,363 B2 | 5/2007 | Rice et al. | |
| D552,901 S | 10/2007 | Wilfong, Jr. et al. | |
| D571,518 S | 6/2008 | Waldman | |
| D575,973 S | 9/2008 | Goodman et al. | |
| 7,431,208 B2 | 10/2008 | Feldman et al. | |
| 7,475,885 B2 | 1/2009 | Kovath | |
| 7,530,537 B2 * | 5/2009 | Kandah | B65B 67/1216 |
| | | | 220/482 |
| 7,587,756 B2 | 9/2009 | Peart et al. | |
| 7,610,717 B2 | 11/2009 | Luken et al. | |
| 7,654,409 B2 | 2/2010 | Hoffman | |
| 7,716,064 B2 | 5/2010 | Mcintyre et al. | |
| D616,680 S | 6/2010 | Snider | |
| 7,850,014 B2 | 12/2010 | Nguyen et al. | |
| 7,887,068 B2 | 2/2011 | Ferguson | |
| 8,069,092 B2 | 11/2011 | Bryant | |
| D650,209 S | 12/2011 | Snider | |
| D654,737 S | 2/2012 | Guindi | |
| 8,177,079 B2 | 5/2012 | Schwartzkopf et al. | |
| D666,858 S | 9/2012 | Goodman | |
| D667,250 S | 9/2012 | Goodman et al. | |
| 8,292,094 B2 | 10/2012 | Morton | |
| 8,336,800 B1 | 12/2012 | Lopez | |
| D689,282 S | 9/2013 | Lindeman | |
| 8,572,712 B2 | 10/2013 | Rice et al. | |
| D693,577 S | 11/2013 | Goodman et al. | |
| 8,640,890 B2 | 2/2014 | Schiller | |
| 8,668,207 B1 * | 3/2014 | Gilliam | G09F 23/06 |
| | | | 280/33.992 |
| 8,746,640 B2 | 6/2014 | Broadley et al. | |
| 8,814,039 B2 | 8/2014 | Bishop et al. | |
| D713,663 S | 9/2014 | Pryor | |
| 8,820,633 B2 | 9/2014 | Bishop et al. | |
| 8,851,369 B2 | 10/2014 | Bishop et al. | |

(56) References Cited

U.S. PATENT DOCUMENTS

| | | | |
|---|---|---|---|
| D718,054 S | 11/2014 | Goodman et al. | |
| D719,372 S | 12/2014 | Goodman et al. | |
| 8,905,411 B1 | 12/2014 | Blanton | |
| D720,538 S | 1/2015 | Goodman et al. | |
| D728,255 S | 5/2015 | Guindi et al. | |
| 9,199,656 B1 | 12/2015 | Tong et al. | |
| D746,592 S | 1/2016 | Goodman et al. | |
| D747,876 S | 1/2016 | Goodman et al. | |
| D750,472 S | 3/2016 | Kuka | |
| D751,763 S | 3/2016 | Goodman et al. | |
| D784,721 S | 4/2017 | Goodman et al. | |
| 9,623,995 B2 | 4/2017 | Tan | |
| D785,333 S | 5/2017 | Goodman et al. | |
| D785,369 S | 5/2017 | Goodman et al. | |
| D787,303 S | 5/2017 | Garvin | |
| 9,656,827 B2 | 5/2017 | Sudhir | |
| 9,737,141 B2 | 8/2017 | Johnson | |
| D796,771 S | 9/2017 | Bacallao et al. | |
| D803,032 S | 11/2017 | Jammehdiabadi | |
| 9,844,283 B2 | 12/2017 | Bacallao | |
| 2002/0145086 A1 | 10/2002 | Alvarado et al. | |
| 2002/0170937 A1 | 11/2002 | Yeh et al. | |
| 2002/0185510 A1 | 12/2002 | Holsclaw | |
| 2002/0185513 A1 | 12/2002 | Morris | |
| 2003/0000905 A1 | 1/2003 | Zidek | |
| 2003/0042694 A1 | 3/2003 | Werner | |
| 2003/0052464 A1 | 3/2003 | McGuire | |
| 2003/0098326 A1 | 5/2003 | Wile | |
| 2003/0121871 A1 | 7/2003 | Zadro | |
| 2003/0198390 A1 | 10/2003 | Loui et al. | |
| 2004/0000529 A1 | 1/2004 | Gladnick et al. | |
| 2004/0000612 A1 | 1/2004 | Young | |
| 2004/0075015 A1 | 4/2004 | Cain et al. | |
| 2004/0124598 A1 | 7/2004 | Williams | |
| 2004/0139398 A1 | 7/2004 | Testa et al. | |
| 2004/0178298 A1 | 9/2004 | Kennard | |
| 2004/0262385 A1 | 12/2004 | Blaeuer | |
| 2005/0056718 A1 | 3/2005 | Kamenstein | |
| 2005/0205578 A1 | 9/2005 | Yeh | |
| 2005/0284729 A1 | 12/2005 | LoRusso | |
| 2006/0049591 A1* | 3/2006 | Pennell | B62B 3/1464 |
| | | | 280/33.992 |
| 2006/0097467 A1 | 5/2006 | Solomon et al. | |
| 2006/0124799 A1 | 6/2006 | Johnson | |
| 2006/0226187 A1 | 10/2006 | Linker | |
| 2007/0095769 A1 | 5/2007 | Jenkins | |
| 2007/0176058 A1 | 8/2007 | Kohn | |
| 2007/0186515 A1 | 8/2007 | Ruetten et al. | |
| 2007/0204044 A1 | 8/2007 | Rice et al. | |
| 2007/0261159 A1 | 11/2007 | Marks | |
| 2007/0278359 A1* | 12/2007 | Kandah | B65B 67/1216 |
| | | | 248/99 |
| 2008/0000910 A1 | 1/2008 | Gaillard | |
| 2008/0001019 A1 | 1/2008 | Brown | |
| 2008/0215448 A1 | 9/2008 | Boyle et al. | |
| 2008/0215449 A1 | 9/2008 | Boyle et al. | |
| 2008/0217342 A1* | 9/2008 | Cinque | A47J 41/0044 |
| | | | 220/592.2 |
| 2008/0245684 A1 | 10/2008 | Yeatman | |
| 2009/0078731 A1 | 3/2009 | Yi | |
| 2009/0078815 A1 | 3/2009 | Tong et al. | |
| 2009/0092342 A1 | 4/2009 | Rolim de Oliveira | |
| 2009/0184162 A1 | 7/2009 | Rice et al. | |
| 2009/0261050 A1 | 10/2009 | Curren | |
| 2009/0319352 A1 | 12/2009 | Boyle et al. | |
| 2009/0327087 A1 | 12/2009 | Beck et al. | |
| 2010/0096514 A1 | 4/2010 | Adair et al. | |
| 2010/0102014 A1 | 4/2010 | Yang | |
| 2010/0123050 A1 | 5/2010 | Astwood | |
| 2010/0148019 A1 | 6/2010 | Simhaee | |
| 2010/0219219 A1 | 9/2010 | Svetina | |
| 2010/0264101 A1 | 10/2010 | Ma | |
| 2011/0266092 A1 | 11/2011 | Marquis et al. | |
| 2012/0125970 A1 | 5/2012 | Tsui | |
| 2012/0167182 A1 | 6/2012 | Rice et al. | |
| 2012/0169020 A1 | 7/2012 | Farrell | |
| 2012/0305618 A1 | 12/2012 | Tan | |
| 2012/0305619 A1 | 12/2012 | Tan | |
| 2013/0026120 A1 | 1/2013 | Johnson | |
| 2013/0037665 A1 | 2/2013 | Brasell et al. | |
| 2013/0048689 A1* | 2/2013 | Ling | B62B 3/146 |
| | | | 224/411 |
| 2013/0092804 A1 | 4/2013 | Laitila et al. | |
| 2013/0134181 A1 | 5/2013 | Helseth et al. | |
| 2013/0264242 A1* | 10/2013 | Wojno | B65D 21/0209 |
| | | | 206/499 |
| 2013/0330163 A1 | 12/2013 | Marsh | |
| 2014/0048576 A1 | 2/2014 | Tan | |
| 2014/0131506 A1 | 5/2014 | Clarkin | |
| 2014/0144966 A1 | 5/2014 | Tan | |
| 2014/0209651 A1 | 7/2014 | Wilfong | |
| 2014/0367507 A1 | 12/2014 | Trampolski | |
| 2016/0016752 A1 | 1/2016 | Helseth et al. | |
| 2016/0096542 A1 | 4/2016 | Fukushima | |
| 2016/0107668 A1* | 4/2016 | Robins | B62B 3/1472 |
| | | | 224/411 |
| 2016/0183744 A1 | 6/2016 | Sadikov et al. | |
| 2016/0227969 A1 | 8/2016 | Morris | |
| 2016/0242605 A1 | 8/2016 | Heymann et al. | |
| 2016/0270607 A1 | 9/2016 | Zeng | |
| 2016/0300235 A1 | 10/2016 | Boyle et al. | |
| 2016/0311454 A1 | 10/2016 | Hendrick et al. | |
| 2016/0367088 A1 | 12/2016 | Allard et al. | |
| 2017/0066550 A1 | 3/2017 | Tsai | |
| 2017/0172322 A1 | 6/2017 | Bacallao | |
| 2017/0174243 A1 | 6/2017 | Bacallao et al. | |
| 2017/0197650 A1 | 7/2017 | Whistler | |
| 2017/0259959 A1 | 9/2017 | Nilsson et al. | |
| 2017/0267412 A1 | 9/2017 | Krause | |
| 2017/0275126 A1 | 9/2017 | Sudhir | |
| 2017/0325603 A1 | 11/2017 | Bacallao | |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Non-Final Office Action in U.S. Appl. No. 15/653,768, dated Jan. 10, 2018; 31 pages.

Non-Final Office Action in U.S. Appl. No. 15/641,367, dated Jan. 12, 2018; 9 pages.

Non-Final Office Action in U.S. Appl. No. 15/703,307, dated Jan. 18, 2018; 9 pages.

Search Report in GB Patent Application No. GB1713283.8, dated Dec. 22, 2017; 4 pages.

"Universal Double Car Vehicle Hangers/Hooks Grocery Bags/Handbags/Umbrellas Organizer—Black," DealsMachine.com, accessed on Oct. 15, 2015; 2 pages.

"Over-the-Door Hook 3 Hook InterDesign," Target.com, accessed on Oct. 15, 2015; 4 pages.

(56) References Cited

OTHER PUBLICATIONS

JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag Wasty 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," Organizelt.com, accessed on Jun. 14, 2017; 2 pages.
"Simplehuman Stainless Steel Grocery Bag Holder," ContainerStore.com, accessed on Jun. 14, 2017; 2 pages.
Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7, 2018; 5 pages.
Non-Final Office Action in U.S. Appl. No. 15/383,151, dated May 25, 2018; 13 pages.
Non-Final Office Action in U.S. Appl. No. 15/383,170, dated Jul. 3, 2018; 10 pages.
Final Office Action in U.S. Appl. No. 15/383,126 dated Nov. 14, 2018; 6 pages.

* cited by examiner

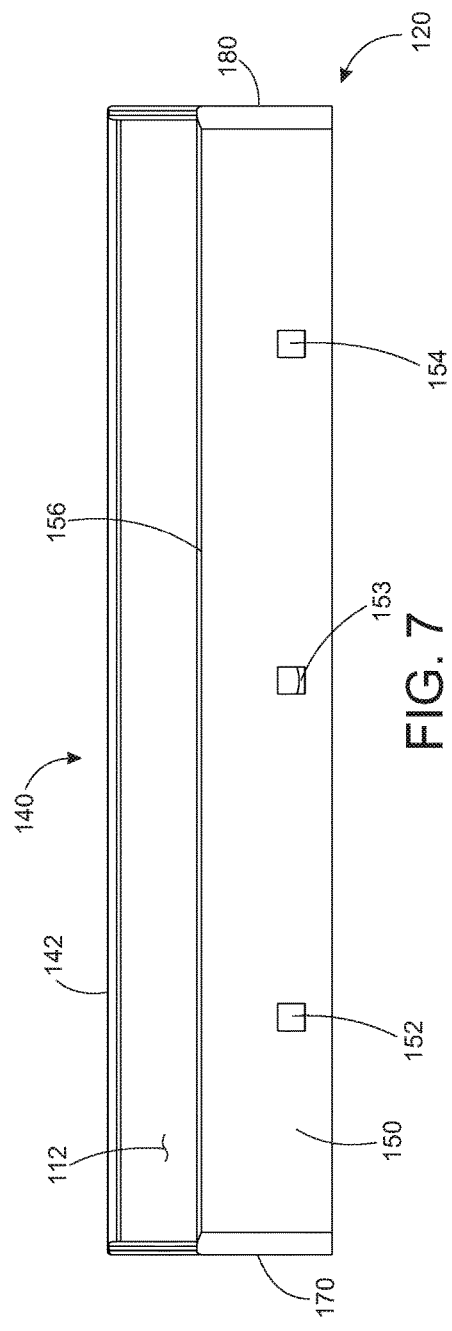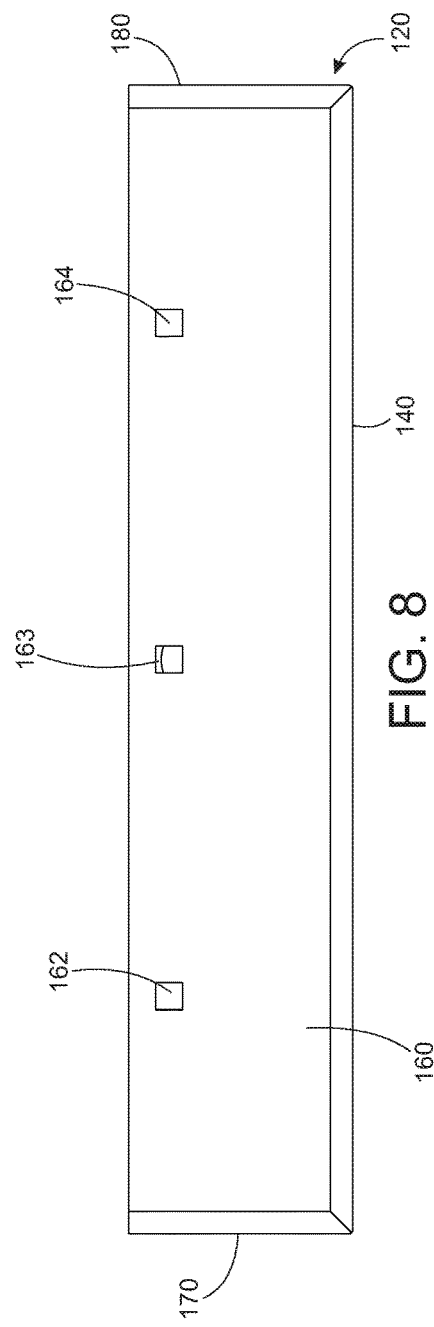

SHOPPING CART BAGGING STATION

CROSS REFERENCE TO RELATED APPLICATION

This invention claims priority to U.S. provisional patent application Ser. No. 62/546,850, filed Aug. 17, 2017, and entitled "Shopping Cart Bagging Station", which is incorporated entirely herein by reference.

BACKGROUND OF THE INVENTION

Technical Field

This invention relates to retail store fixtures, and specifically to a bagging station that couples to a shopping cart

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations other than at checkout stations. There is a need for bagging stations at locations in retail stores besides the checkout station.

Accordingly, what is needed is a bagging station that can be mounted in a shopping cart, so that customers can bag their purchases as they shop.

BRIEF DESCRIPTION OF THE DRAWINGS

FIG. 7 shows a top view of the box front portion of FIG. 6;

FIG. 8 shows a bottom view of the box front portion of FIG. 6;

DETAILED DESCRIPTION OF EMBODIMENTS OF THE INVENTION

Disclosed herein are embodiments of an invention related to retail store fixtures, and, more specifically, to a bagging station that couples to a shopping cart. The disclosed shopping cart bagging station can be used by customers to bag their purchases as they shop. The disclosed shopping cart bagging station includes a box front portion and a back plate that couple together to form a rectangular enclosure for shopping bags. The box front portion has at least one bag holder hook inside the enclosure that shopping bags are hung from. An opening in the box front portion is used to access the shopping bags hanging from the bag holder hook in the enclosure. At least one cart coupling hook is coupled to the back plate to couple the shopping cart bagging station to a shopping cart.

A bagging station holds and dispenses shopping bags. Bagging stations are often located at checkout counters in retail stores so that items that have been purchased can be bagged. Bags are opened one at a time and filled with one or more items that have been purchased. When one bag is full, it is removed from the bagging station and the next bag is opened and filled if needed. The disclosed shopping cart bagging station is hung from a shopping cart so that customers can bag their purchased items as they shop. A customer using electronic checkout no longer needs to visit the checkout counter to pay for items. Using the shopping cart bagging station provides the customer the means to bag their items while they shop. The disclosed shopping cart bagging station has a box-type enclosure that keeps the unfilled bags from interfering with products or filled bags in the shopping cart.

Figure 1:
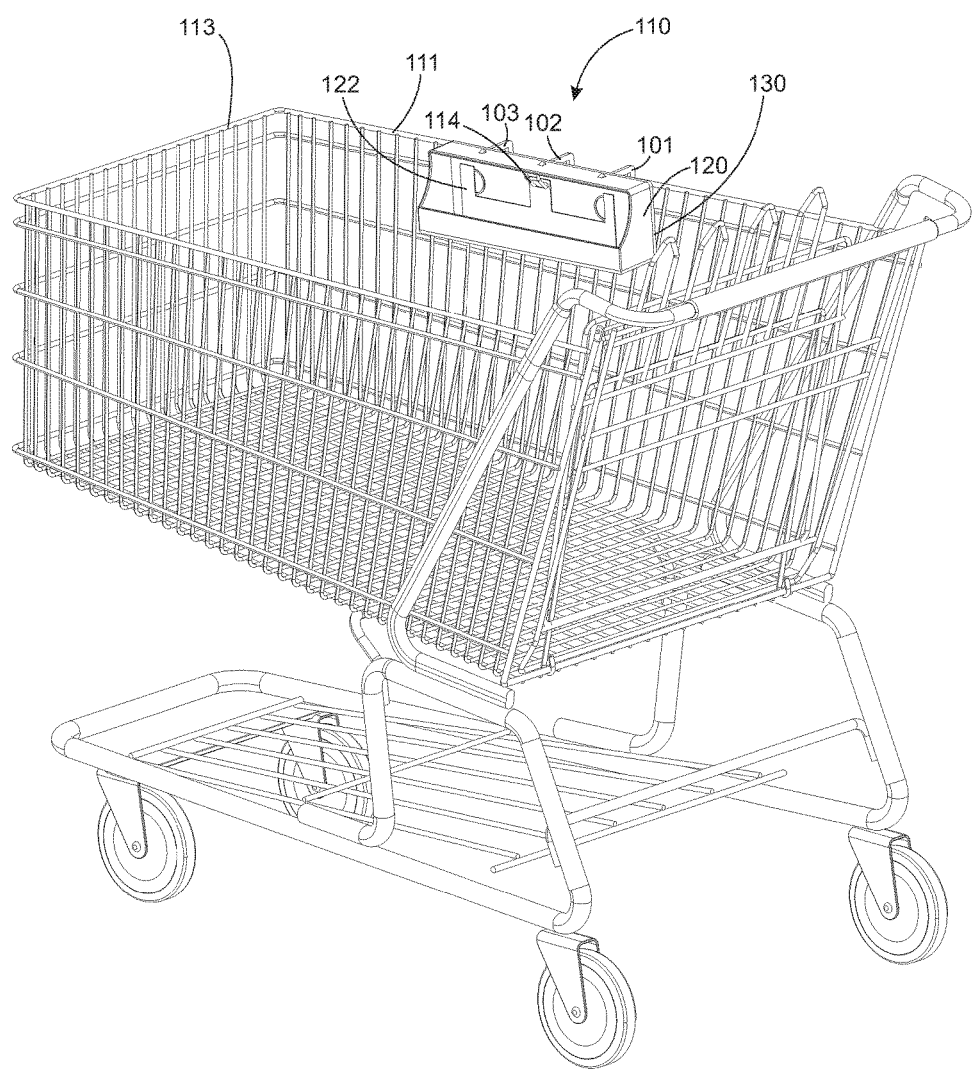
FIG. 1 shows a perspective view of a shopping cart bagging station coupled to a shopping cart.
Figure 2:
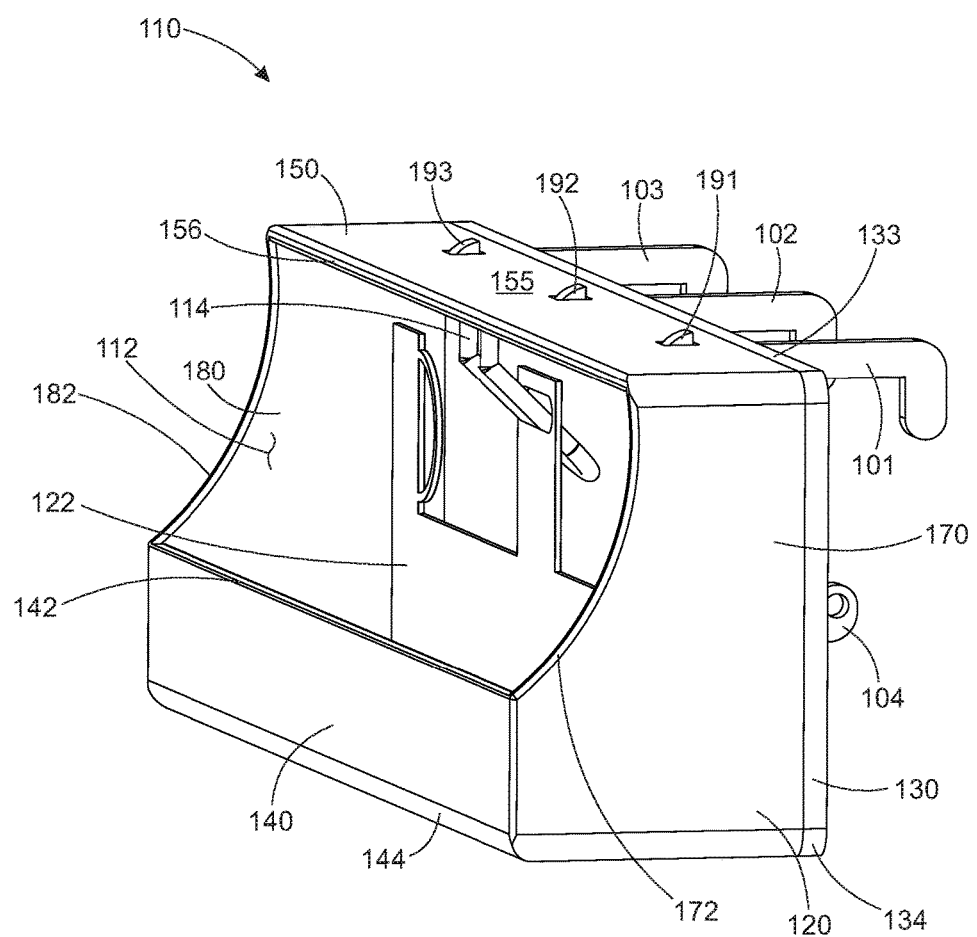
FIG. 2 shows a perspective view of a shopping cart bagging station holding at least one shopping bag.

FIG. 1 shows a perspective view of one embodiment of a shopping cart bagging station 110 hung from a shopping cart 113. Shopping cart bagging station 110 is hung from a side 111 of shopping cart 113 using cart coupling hooks 101, 102, and 103. Shopping cart bagging station 110 holds one or more than one shopping bag 122 (FIG. 1 and FIG. 2). Shopping bag 122 is hung from a bag holder hook 114 inside of shopping cart bagging station 110. A customer using shopping cart 113 can use shopping cart bagging station 110 to hold and dispense shopping bags as they shop. When the customer wishes to fill shopping bag 122, shopping bag 122 is accessed through an opening 112 (FIG. 2) to open and fill shopping bag 122. Shopping bag 122 is opened and filled while hanging from bag holder hook 114, or, shopping bag 122 can be removed from bag holder hook 114 to be filled. Shopping cart bagging station 110 has a box front portion 120 that partially encloses shopping bag 122 so that shopping bag 122 does not interfere with other items in shopping cart 113. FIG. 1 shows shopping cart bagging station 110 coupled to a side 111 of shopping cart 113, but this is not meant to be limiting. Shopping cart bagging station 110 can be coupled to the front, sides, back, interior, or exterior of shopping cart 113. Shopping cart bagging station 110 can be coupled to many different forms of shopping carts.

Figure 3:
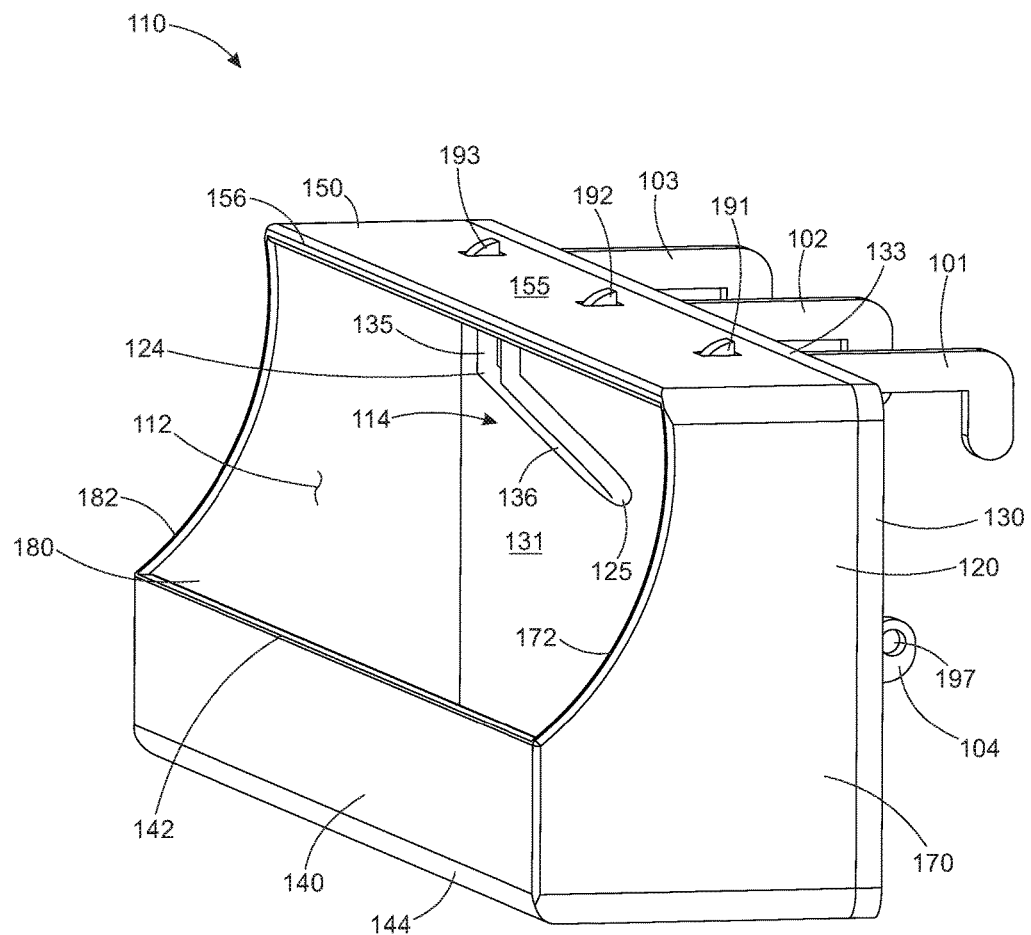
FIG. 3 shows a front perspective view of the shopping cart bagging station of FIG. 2.
Figure 4:
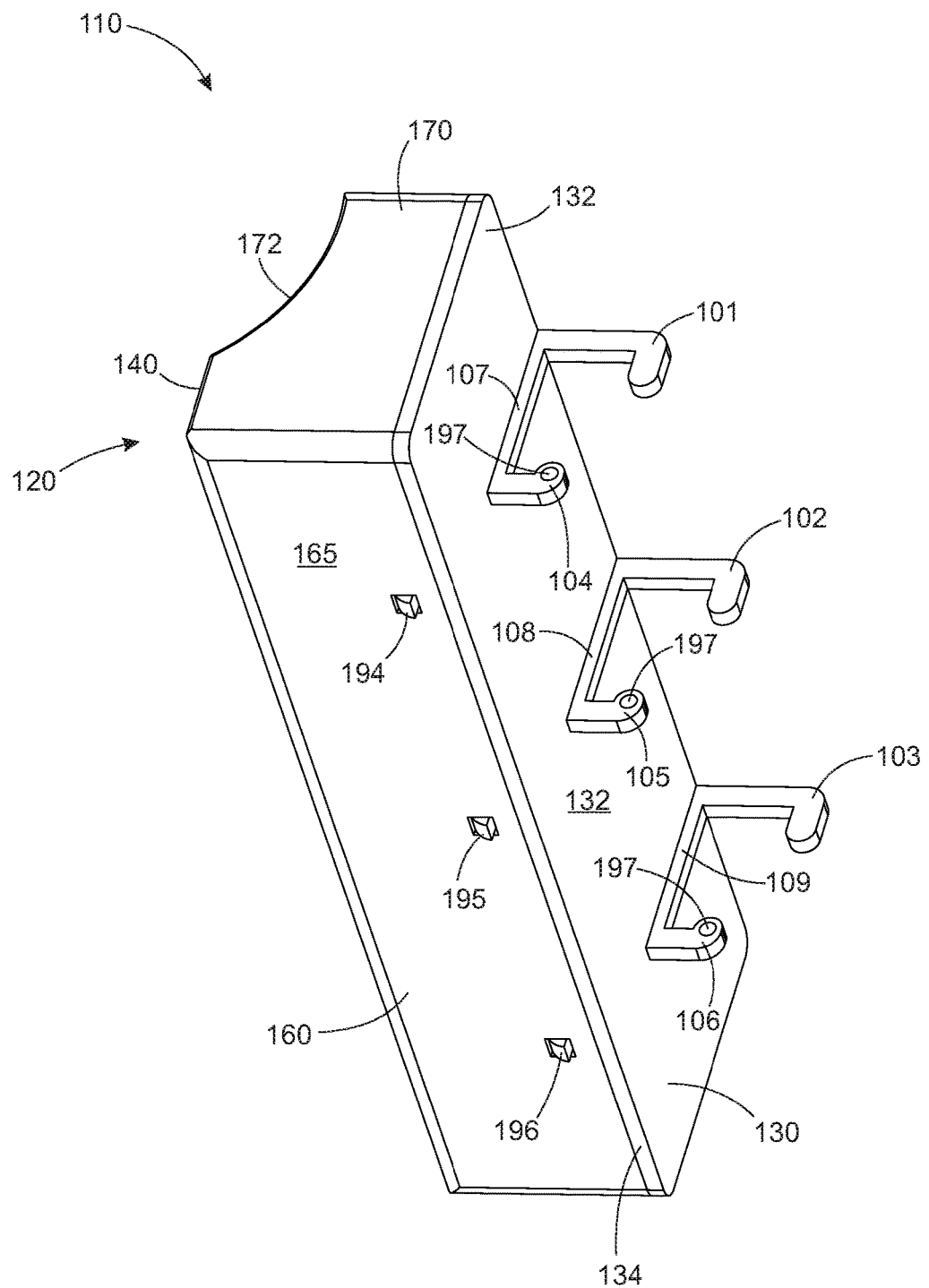
FIG. 4 shows a rear perspective view of the shopping cart bagging station of FIG. 2.
Figure 5:
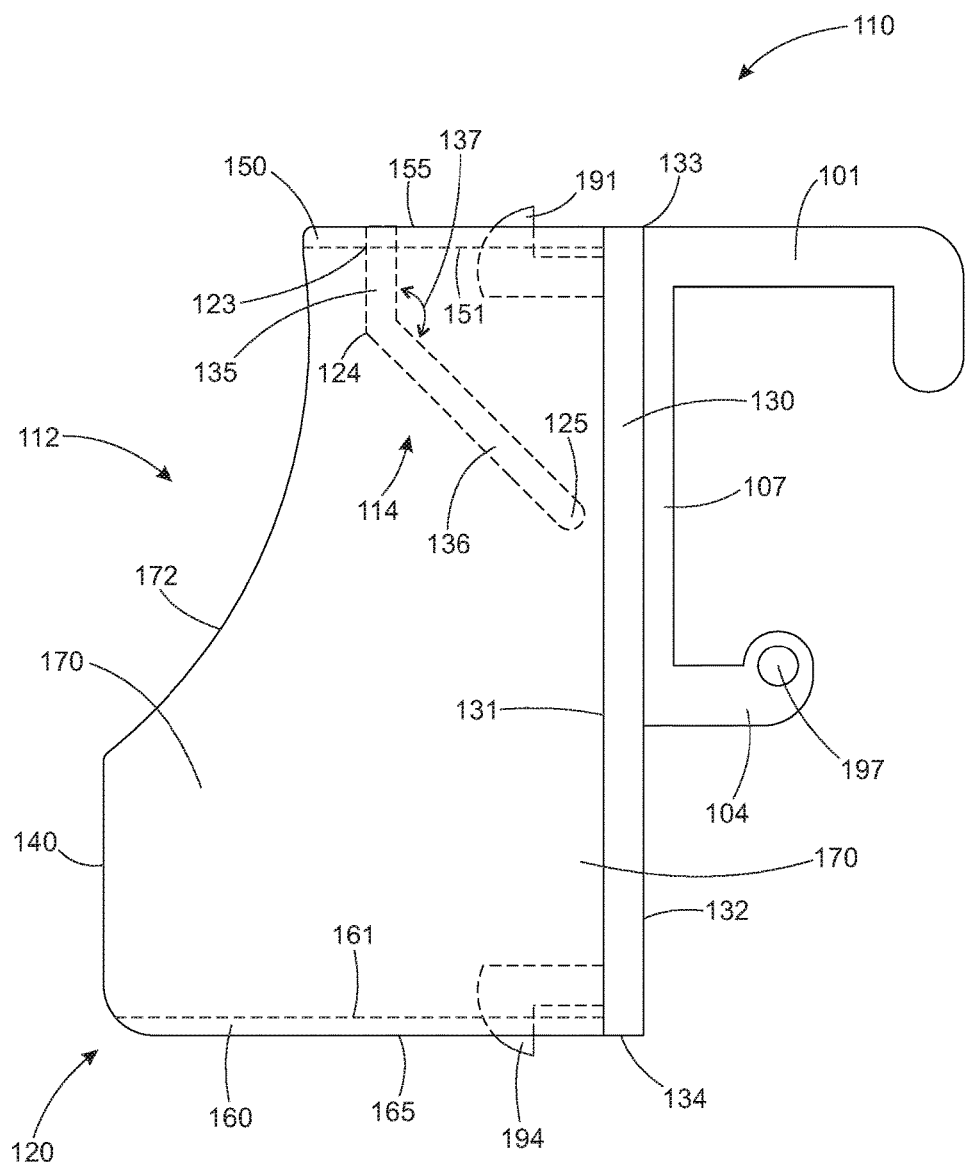
FIG. 5 shows a side view of the shopping cart bagging station of FIG. 2.

FIG. 2 through FIG. 5 show details of shopping cart bagging station 110 of FIG. 1. FIG. 2 shows a front perspective view of shopping cart bagging station 110 holding at least one shopping bag 122. Shopping bag 122 can be one shopping bag or a stack of shopping bags. FIG. 3 shows a front perspective view of shopping cart bagging station 110 with no shopping bags. FIG. 4 shows a rear perspective view of shopping cart bagging station 110, and FIG. 5 shows a side view of shopping cart bagging station 110.

Shopping cart bagging station 110 includes a box front portion 120, a back plate 130, a bag holder hook 114, cart coupling hooks 101, 102, and 103, and an opening 112 in box front portion 120. Back plate 130 is removeably coupled to box front portion 120 to form an enclosure for shopping bag 122. Shopping bag 122 hangs from bag holder hook 114. Opening 112 provides access to shopping bag 122. Cart coupling hooks 101, 102, and 103 couple shopping cart bagging station 110 to shopping cart 113.

Figure 6:
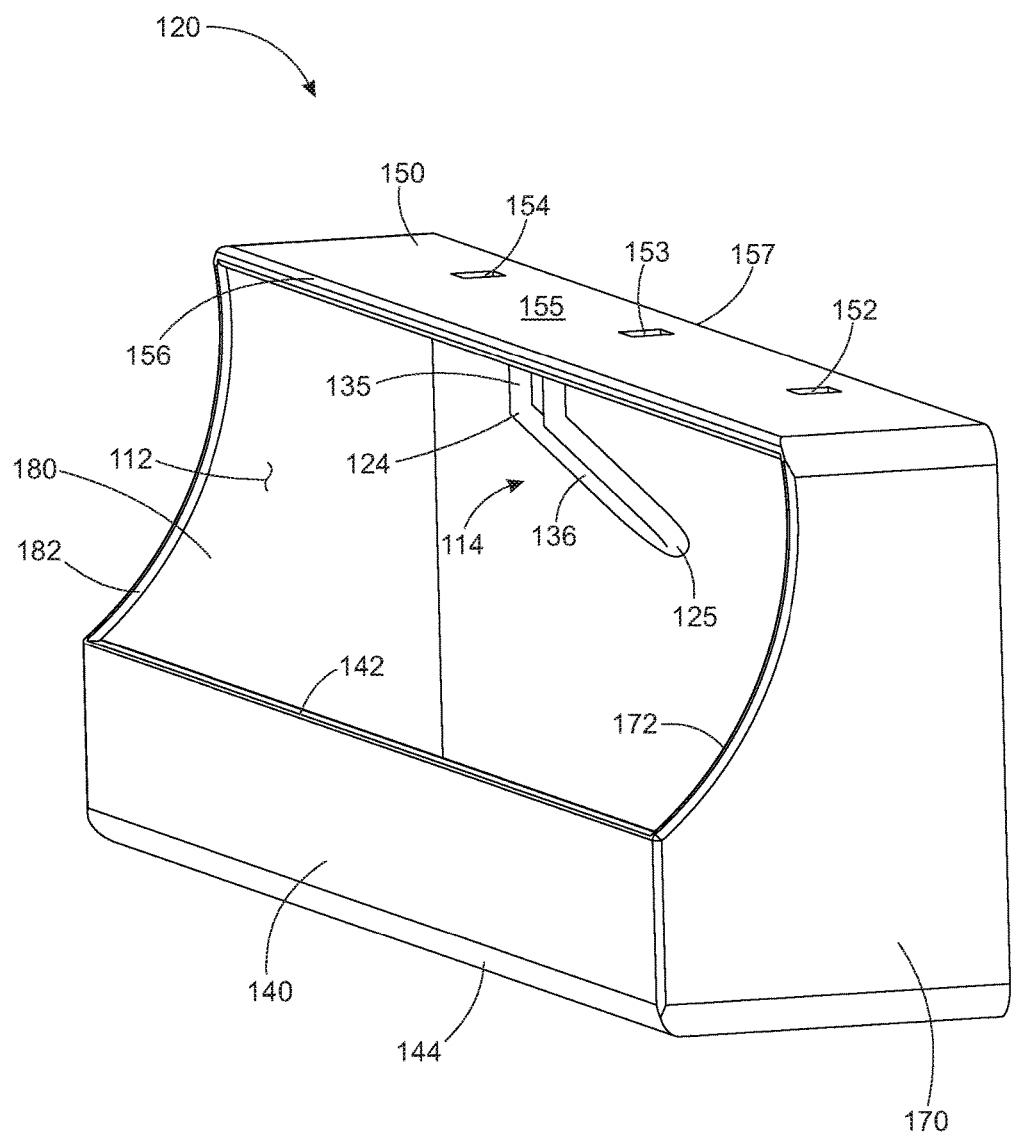
FIG. 6 shows a front perspective view of a box front portion.

Box front portion 120 is generally in the shape of a rectangular enclosure with an open back, in this embodiment. FIG. 6 through FIG. 8 shows details of box front portion 120 and bag holder hook 114. FIG. 6 shows a front perspective view of box front portion 120. FIG. 7 and FIG. 8 shows bottom and top views, respectively, of box front portion 120.

Box front portion 120 includes a front plate 140, a top plate 150, a bottom plate 160, a first side plate 170, and a second side plate 180, as shown in FIG. 1 through FIG. 8. Front plate 140, top plate 150, bottom plate 160, first side plate 170, and second side plate 180 are coupled together to form a rectangular enclosure with no back and with opening 112 in box front portion 120. In this embodiment, front plate 140, top plate 150, bottom plate 160, first side plate 170, and second side plate 180 are formed as an integral structure, but this is not meant to be limiting. In some embodiments, front plate 140, top plate 150, bottom plate 160, first side plate 170, and second side plate 180 are separate plates or elements that are coupled together. Back plate 130 is coupled to box front portion 120 to form a rectangular enclosure with opening 112. Box front portion 120 with back plate 130 coupled to box front portion 120 form an enclosure around shopping bag 122 hanging from bag holder hook 114.

Top plate 150 is a flat rectangular plate of rigid material in this embodiment, best seen in FIG. 7. Top plate 150 has a top plate front edge 156 that is a defining (or bounding) edge of opening 112. Top plate 150 includes three top clip slots 152, 153, and 154. Top clip slots 152, 153, and 154 are rectangular holes through top plate 150 that are used to couple back plate 130 to top plate 140, see FIG. 2, FIG. 3, and FIG. 5. Top clip slots 152, 153, and 154 do not extend to (or open to) an edge of top plate 150, in this embodiment.

Bag holder hook 114 is coupled to an inner surface 151 of top plate 150 (FIG. 5). Bag holder hook 114 holds shopping bag 122 and extends towards back plate 130 (FIG. 5). Bag holder hook 114 is an elongate member formed of a rigid material. In this embodiment, bag holder hook 114 is formed of two metal or plastic rods extending side-by side and coupled together at a bag holder hook second end 125, but this is not meant to be limiting. Bag holder hook 114 has a bag holder hook first end 123 and a bag holder hook second end 125 opposing bag holder hook first end 123, best seen in FIG. 5. Bag holder hook 114 has a bag holder hook first bend 124 that divides bag holder hook 114 into a straight hook top section 135 and a straight hook bottom section 136. Hook top section 135 is coupled to and extends from inner surface 151 of top plate 150. In this embodiment, hook top section 135 is perpendicular to top plate 150. Hook top section 150 extends from bag holder hook first end 123 to bag holder bend 124. Bag holder hook first end 123 is coupled to inner surface 151. Hook bottom section 136 extends from bag holder bend 124 to bag holder hook second end 125. Bag holder hook bend 124 forms an angle 137 between hook top section 135 and hook bottom section 136. Angle 137 is about 135 degrees in this embodiment. In some embodiments, angle 137 is between 115 and 155 degrees. Angle 137 with values in the range of 115 to 155 degrees provide for a bag holder hook 114 that holds shopping bag 122 but does not make it difficult to add or remove shopping bag 122 from bag holder hook 114. Hook top section 135 and hook bottom section 136 are straight in this embodiment, but this is not meant to be limiting (see bag holder hook 115 shown in FIG. 9 and FIG. 10 and described herein, for example). In this embodiment, bag holder hook 114 extends towards back plate 130. Bag holder hook 114 extending towards back plate 130 means that bag holder hook bend 124 bends bag holder hook 114 towards back plate 130, and away from front plate 140. Having bag holder hook 114 extending towards back plate 130 allows shopping bag 122 to be hung from bag holder hook 114, but tends to keep shopping bag 122 from sliding off of bag holder hook 114 and out of shopping cart bagging station 110. When shopping bag 122 is removed from bag holder hook 114, shopping bag 122 is not slid off of bag holder hook 114, but torn off. This is how a shopping bag hanger hole of each shopping bag 122 is designed to work—the hanger hole is torn when opening shopping bag 122 and when removing shopping bag 122 from bag holder hook 114. Since shopping bag 122 does not have to be removed from bag holder hook 114 with the hanger hole intact, it is preferable to have bag holder hook 114 extend towards back plate 130. It is easier to tear the hole and remove shopping bag 122 when bag holder hook 114 extends towards back plate 130.

Bottom plate 160 is a rectangular shaped flat plate formed of rigid material in this embodiment, best seen in FIG. 8. Bottom plate 160 is larger than top plate 150 because opening 112 extends through a portion of top plate 150, see FIG. 3, FIG. 5 and FIG. 7. Bottom plate 160 has three bottom clip slots 162, 163, and 164, as shown in FIG. 8. Bottom clip slots 162, 163, and 164 are each rectangular holes through bottom plate 160. Bottom clip slots 162, 163, and 164 are used to couple back plate 130 to bottom plate 160, see FIG. 4 and FIG. 5. Bottom clip slots 162, 163, and 164 do not open to an edge of bottom plate 160, in this embodiment.

Front plate 140 is rectangular in this embodiment, with a front plate top edge 142 that is an edge of opening 112. Front plate 140 is smaller than opening 112, best seen in FIG. 2 and FIG. 3. Front plate 140 being smaller than opening 112 means that front plate 140 has a front plate area that is smaller than an opening area of opening 112.

First side plate 170 is a flat plate of rigid material with five edges. First side plate 170 has four straight edges and one curved cutout along a first side curved edge 172 where opening 112 extends to first side plate 170, see FIG. 2, FIG. 3, and FIG. 6. Similarly, second side plate 180 is a flat five-edged plate of rigid material, with four straight edges and a curved cutout along a second side curved edge 182 where opening 112 extends to second side plate 180.

Opening 112 is configured to allow shopping bag 122 to be inserted into and removed from shopping cart bagging station 110. Shopping bag 122, which can be one shopping bag or a stack of shopping bags, is hung on bag holder hook 114 by putting shopping bag 122 into box front portion 120 through opening 112, and hanging shopping bag 122, or the whole stack of shopping bags, on bag holder hook 114 by extending bag holder hook 114 through the hanger hole in shopping bag 122. In this embodiment, there are no hooks for hanging the handles of shopping bag 122 from, but this is not meant to be limiting. In some embodiments, shopping cart bagging station 110 includes hooks for hanging the handles of shopping bag 122 from (see, for example FIG. 9 and FIG. 10 and the accompanying description). When it is desired to open shopping bag 122, shopping bag 122 is opened by tearing the front side of shopping bag 122 off of bag holder hook 114 and filling shopping bag 122. Shopping bag 122 can be filled while it is inside of shopping cart bagging station 110 or while it hangs partially inside and partially outside of shopping cart bagging station 110. Once shopping bag 122 is filled, the back side of shopping bag 122 is torn off of bag holder hook 114, and shopping bag 122 is removed from shopping cart bagging station 110 through opening 112. If it is desired to fill another shopping bag, the next shopping bag hanging from bag holder hook 114 can be similarly opened and filled. Shopping cart bagging station 110 is smaller than many shopping bags, so the shopping bags can be rolled or folded up in the bottom of shopping cart bagging station 110. Having shopping cart bagging station 110 be smaller than the shopping bags helps keep shopping cart bagging station 110 small and helps keep shopping bag 122 that is hanging inside of shopping cart bagging station 110 from interfering with or getting tangled with other items or bags that are inside of shopping cart 113.

Opening 112 is through a portion of front plate 140, top plate 150, first side plate 170, and second side plate 180. Top plate 150 is smaller than bottom plate 160 (FIG. 3, FIG. 5, FIG. 7, and FIG. 8), because opening 112 extends through a portion of top plate 150. Opening 112 is larger than front plate 140, see FIG. 3 and FIG. 6.

Opening 112 extends through a portion of first side plate 170 and second side plate 180, see FIG. 3. First side plate 170 has a first side curved edge 172 that extends from a top plate front edge 156 to a front plate top edge 142. First side curved edge 172 defines an edge of opening 112. Second side plate 180 has a second side curved edge 182 that extends from top plate front edge 156 to front plate top edge 142. Second side curved edge 182 defines another edge of opening 112. Opening 112 is defined or bounded by top plate front edge 156, first side curved edge 172, front plate top edge 142, and second side plate curved edge 182, as shown in the figures. Opening 112 is fairly large so that hands can easily reach into shopping cart bagging station 110 to hang shopping bag 122, fill shopping bag 122, and remove shopping bag 122.

Figure 9:
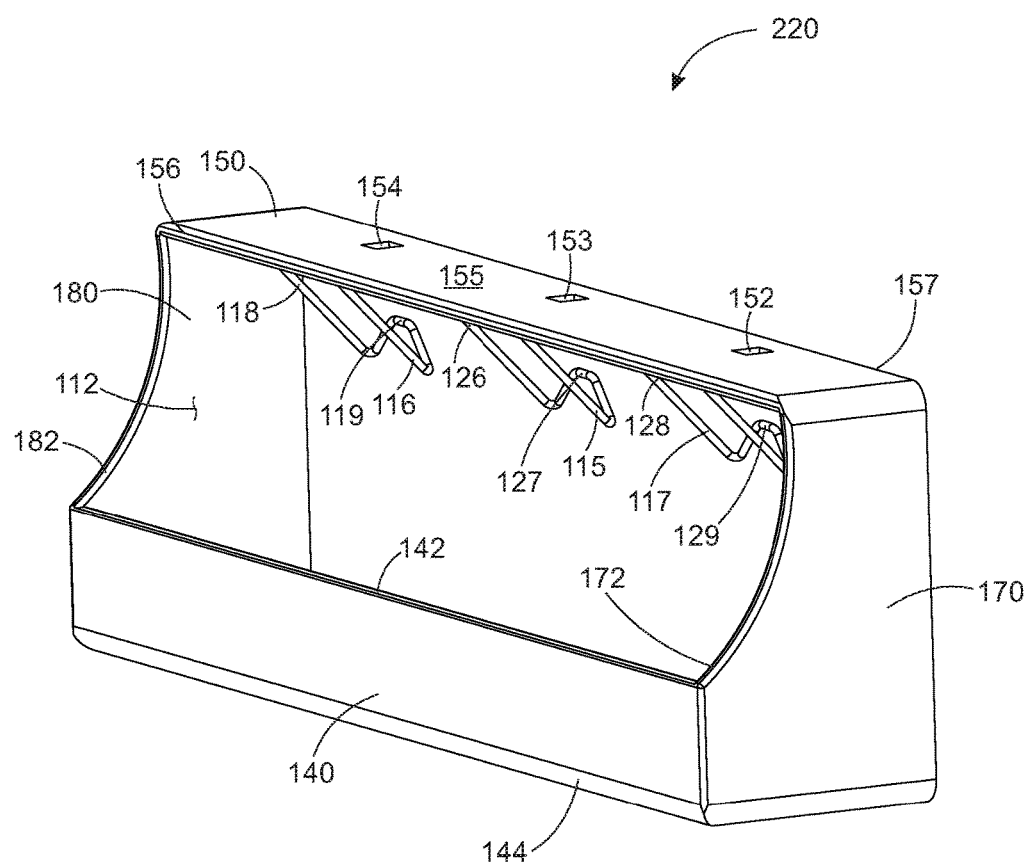
FIG. 9 shows a front perspective view of a further embodiment of a box front portion.
Figure 10:
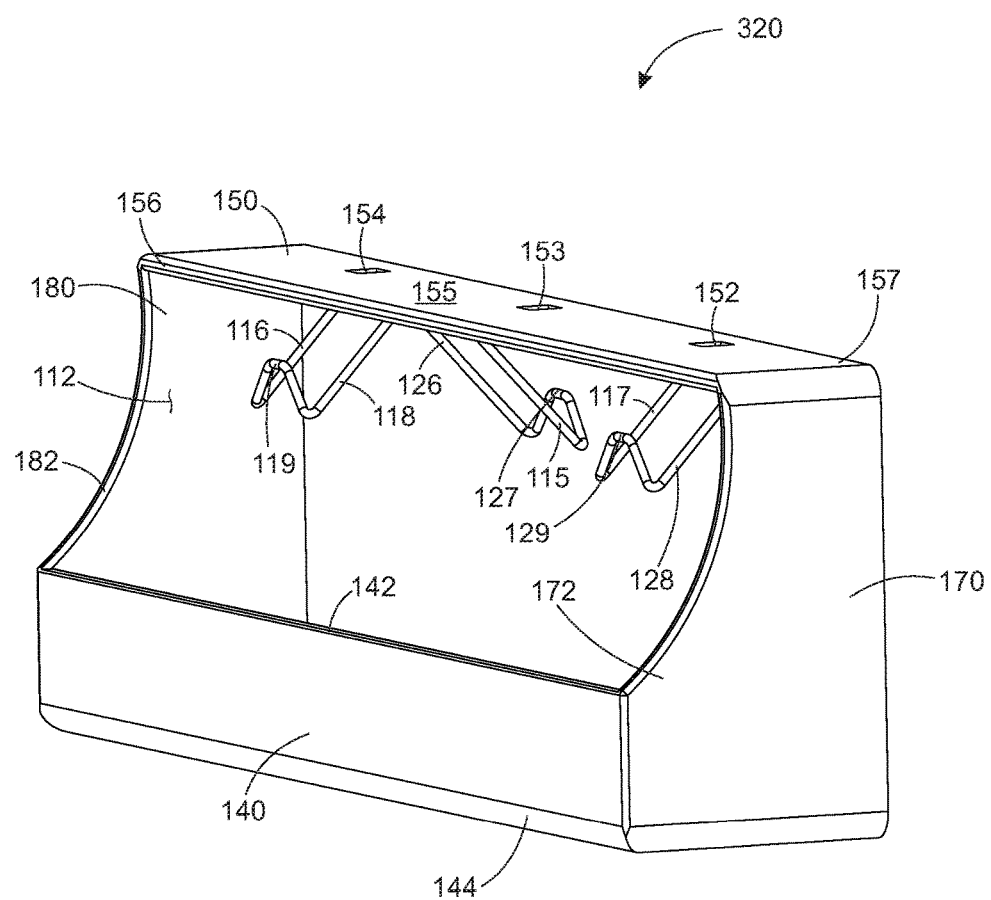
FIG. 10 shows a front perspective view of an additional embodiment of a box front portion.

In the embodiment shown in FIG. 1 through FIG. 8, shopping cart bagging station 110 has one bag holder hook 114, but this is not meant to be limiting. In some embodiments, shopping cart bagging station 110 includes more than one bag holder hook 114. In some embodiments, shopping cart bagging station 110 includes one or more handle holder hooks. FIG. 9 shows an embodiment of a box front portion 220. Box front portion 220 can be used in place of box front portion 120 of shopping cart bagging station 110. FIG. 10 shows an embodiment of a box front portion 320. Box front portion 320 can be used in place of box front portion 120 of shopping cart bagging station 110.

Box front portion 220 shown in FIG. 9 is the same as box front portion 120 except that box front portion 220 includes two handle holder hooks 116 and 117, and bag holder hook 114 is replaced with bag holder hook 115. Bag holder hook 115 is similar to bag holder hook 114 and used for the same purpose. Bag holder hook 115 is used in place of bag holder hook 114 in box front portion 220. The difference between bag holder hook 114 and bag holder hook 115 is that bag holder hook 115 is a J-hook, meaning bag holder hook 115 has a bag holder hook second end 127 that is upturned like the letter J. Bag holder hook 115 has a bag holder hook first end 126 coupled to top plate 150, and bag holder hook second end 127 that opposes bag holder hook first end 126. Bag holder hook 115 extends towards the back of box front portion 220, towards back plate 130 when box front portion 220 is coupled to back plate 130. Bag holder hook second end 127 is upturned towards top plate 150 to more easily catch and hold one or more shopping bags.

Box front portion 220 also includes a first handle holder hook 116 and a second handle holder hook 117. First and second handle holder hooks 116 and 117 are coupled to top plate inner surface 151 of top plate 150 on either side of bag holder hook 115, as shown in FIG. 9. First and second handle holder hooks 116 and 117 are used to hang shopping bag handles on. One or more shopping bags are hung by the hanger hole on bag holder hook 115. One handle for the one or more shopping bags are hung from first handle holder hook 116, and the other handle for the one or more shopping bags is hung from second handle holder hook 117. First and second handle holder hooks 116 and 117 are each J-hooks similar to bag holder hook 115.

First handle holder hook 116 has a first handle holder hook first end 118 coupled to top plate 150, and a first handle holder hook second end 119 opposing first handle holder hook first end 118. First handle holder hook second end 119 is upturned to make first handle holder hook 116 into a J shape.

Second handle holder hook 117 has a second handle holder hook first end 128 coupled to top plate 150, and a second handle holder hook second end 129 opposing second handle holder hook first end 128. Second handle holder hook second end 129 is upturned to make second handle holder hook 117 into a J shape. In the embodiment of box front portion 220 shown in FIG. 9, bag holder hook 115 and first and second handle holder hooks 116 and 117 all face the back side of box front portion 220. When box front portion 220 is coupled to back plate 130, bag holder hook 115 and first and second handle holder hooks 116 and 117 all face back plate 130.

Box front portion 320 shown in FIG. 10 is the same as box from portion 220 except that first and second handle holder hooks 116 and 117 face front plate 140. First and second handle holder hooks 116 and 117 facing front plate 140 means that first and second handle holder hooks 116 and 117 extend towards front plate 140. Having first and second handle holder hooks 116 and 117 extend towards front plate 140 can be desired in some situations where the customer does not wish to tear the handle of the shopping bags when the handles are removed from first and second handle holder hooks 116 and 117.

Other configurations of bag holder hook 115 and first and second handle holder hooks 116 and 117 can be used for different uses of shopping cart bagging station 110. In some embodiments, bag holder hook 115 and first and second handle holder hooks 116 and 117 all face front plate 140. In some embodiments, bag holder hook 115 faces front plate 140 and first and second handle holder hooks 116 and 117 face back plate 130. In some embodiments, bag holder hook 115 and first and second handle holder hooks 116 and 117 are coupled to top plate 150 such that they can be rotated by the customer to face the direction the customer desires.

Figure 11:
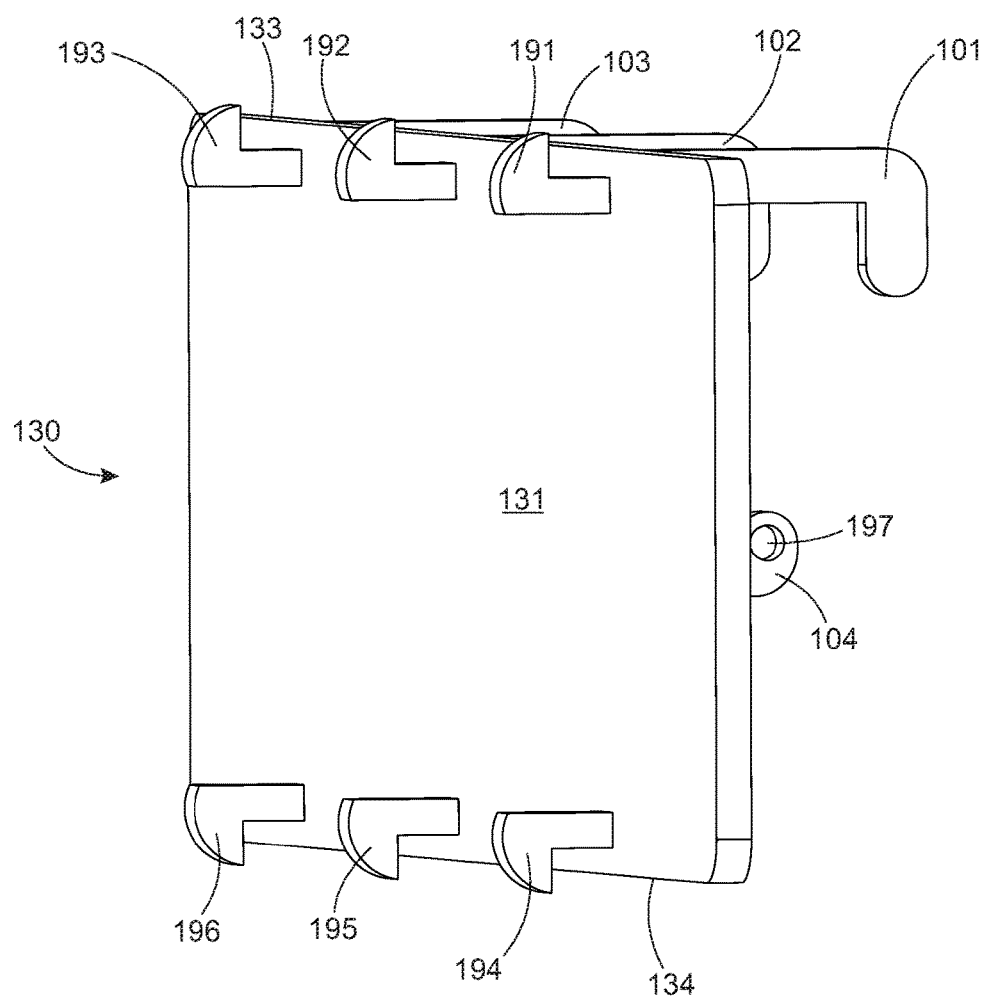
FIG. 11 shows a front perspective view of a back plate.
Figure 12:
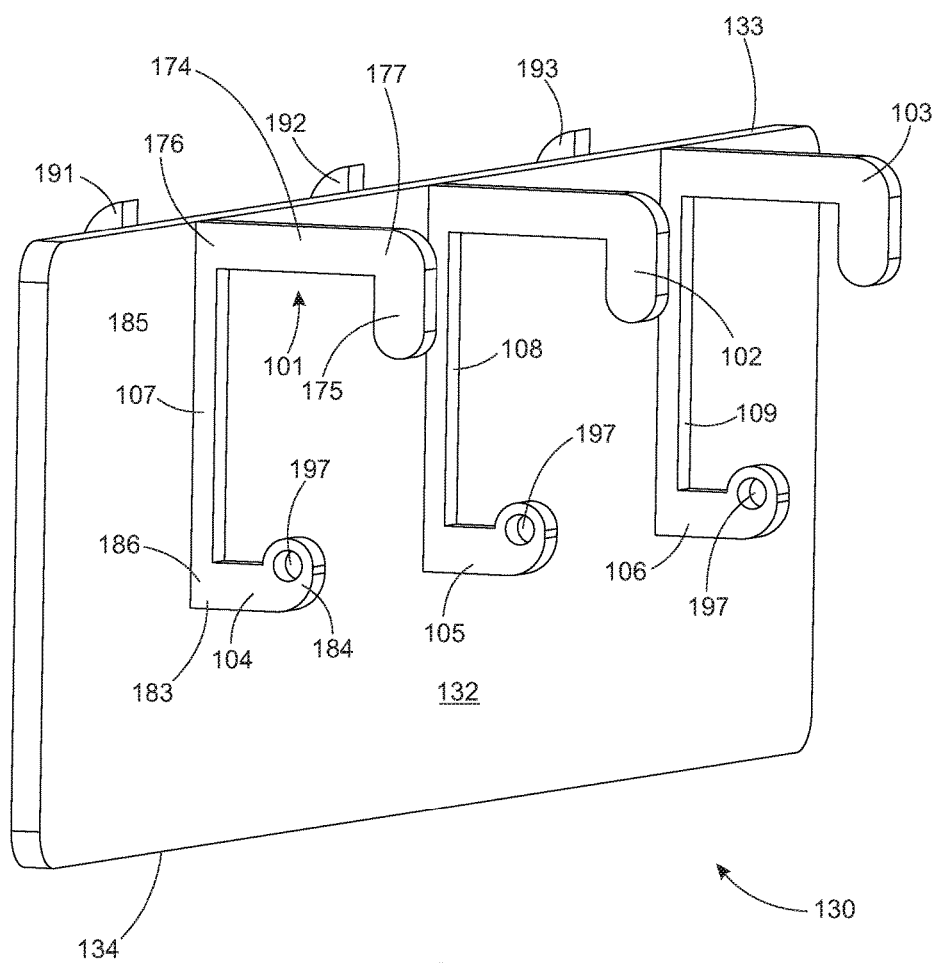
FIG. 12 shows a rear perspective view of the back plate of FIG. 11.

Referring back to FIG. 1 through FIG. 8 and FIG. 11 and FIG. 12, back plate 130 is removeably coupled to box front portion 120 (or box front portion 220 or box front portion 320). Back plate 130 includes at least one locking clip that removeably couples back plate 130 to box front portion 120, as shown in FIG. 2 through FIG. 5. FIG. 11 and FIG. 12 show details of back plate 130. FIG. 11 shows a front perspective view of back plate 130. FIG. 12 shows a rear perspective view of back plate 130. In the embodiment shown in the figures, back plate 130 includes six locking clips, three back plate top locking clips 191, 192, and 193, and three back plate bottom locking clips 194, 195, and 196, as best seen in FIG. 11. Back plate 130 is rectangular in shape in this embodiment, and removeably couples to box front portion 120 as shown in FIG. 1 through FIG. 5. With back plate 130 coupled to box front portion 120, an enclosure for bag holder hook 114 is formed by the combination of box front portion 120 and back plate 130.

Back plate 130 has an inner surface 131 (FIG. 11), an outer surface 132 (FIG. 12), a back plate top edge 133, and a back plate bottom edge 134. Three top locking clips 191, 192, and 193 extend from, and are coupled to, back plate inner surface 131 adjacent back plate top edge 133, as shown in FIG. 11. Three bottom locking clips 194, 195, and 196 extend from, and are coupled to, back plate inner surface 131 of back plate 130 adjacent back plate bottom edge 134. Top locking clips 191, 192, and 193 are each hook-shaped structures that engage with one of top clip slots 152, 153, and 154 of top plate 150 to removeably couple back plate 130 to top plate 150. Top locking clips 191, 192, and 193 each have a shaft that is perpendicular to back plate 130. Top locking clip 191 couples to top clip slot 152 to couple back plate 130 to top plate 150. Top locking clip 191 extends through top clip slot 152 of top plate 150 from top plate inner surface 151 to a top plate outer surface 155, as shown in FIG. 5. Top locking clip 191 extending through top clip slot 152 of top plate 150 from top plate inner surface 151 to top plate outer surface 155 means that top locking clip 191 is extended through top clip slot 152 starting from top plate inner surface 151. Top locking clip 191 extends all the way through top clip slot 152 and extends out of top clip slot 152, sticking out top plate outer surface 155. Top locking clip 192 couples to top clip slot 153 to couple back plate 130 to top plate 150. Top locking clip 192 extends through top clip slot 153 of top plate 150 from top plate inner surface 151 to top plate outer surface 155. Top locking clip 193 couples to top clip slot 154 to couple back plate 130 to top plate 150. Top locking clip 193 extends through top clip slot 154 of top plate 150 from top plate inner surface 151 to top plate outer surface 155.

Similarly, bottom locking clips 194, 195, and 196 are each hook-shaped structures that engage with one of bottom clip slots 162, 163, and 164 of bottom plate 160 to removeably couple back plate 130 to bottom plate 150. Bottom locking clips 194, 195, and 196 each have a shaft that is perpendicular to back plate 130. Bottom locking clip 194 couples to bottom clip slot 162 to couple back plate 130 to bottom plate 160. Bottom locking clip 194 extends through bottom clip slot 162 of bottom plate 160 from a bottom plate inner surface 161 to a bottom plate outer surface 165, as shown in FIG. 5. Bottom locking clip 195 couples to bottom clip slot 163 to couple back plate 130 to bottom plate 160. Bottom locking clip 195 extends through bottom clip slot 163 of bottom plate 160 from bottom plate inner surface 161 to bottom plate outer surface 165. Bottom locking clip 196 couples to bottom clip slot 164 to couple back plate 130 to bottom plate 160. Bottom locking clip 196 extends through bottom clip slot 164 of bottom plate 160 from bottom plate inner surface 161 to bottom plate outer surface 165.

Top locking clips 191, 192, and 193, and bottom locking clips 194, 195, and 196 are flexible enough to bend slightly when back plate 130 is pressed against box front portion 120. Top locking clips 191, 192, and 193, and bottom locking clips 194, 195, and 196 give slightly and then engage with their respective top clip slots 152, 153, or 154, or bottom clip slots 162, 163, or 164 to removeably couple back plate 130 to box front portion 120.

Shopping cart bagging station 110 includes at least one cart coupling hook that couples shopping cart bagging station 110 to shopping cart 113. Shopping cart bagging station 110, in the embodiment shown in the figures, includes three cart coupling hooks, first cart coupling hook 101, second cart coupling hook 102, and third cart coupling hook 103, see FIG. 2, FIG. 3, FIG. 4, and FIG. 12. Each one of first cart coupling hook 101, second cart coupling hook 102, and third cart coupling hook 103 are configured to be coupled to shopping cart 113. Each one of first cart coupling hook 101, second cart coupling hook 102, and third cart coupling hook 103 are coupled to and extend from back plate outer surface 132 adjacent back plate top edge 133, see FIG. 12. Each one of first cart coupling hook 101, second cart coupling hook 102, and third cart coupling hook 103 are hook shaped and hook onto or hang from a rod of shopping cart 113 to couple shopping cart bagging station 110 to shopping cart 113. Each one of first cart coupling hook 101, second cart coupling hook 102, and third cart coupling hook 103 face towards bottom plate 160 because cart coupling hooks 101, 102, and 103 are meant to hang from shopping cart 113, not to have items hang from themselves. Having each one of first cart coupling hook 101, second cart coupling hook 102, and third cart coupling hook 103 face bottom plate 160 means the hook opening of each of hooks 101, 102, and 103 face bottom plate 160 and back plate bottom edge 134.

First cart coupling hook 101 includes a hook shaft 174 and a hook end 175. Hook shaft 174 is an elongate rod or bar of rigid material having a hook shaft first end 176 and a hook shaft second end 177 opposing hook shaft first end 176. Hook shaft first end 176 is coupled to back plate outer surface 132. Hook shaft 174 is perpendicular to back plate 130. Hook end 175 is coupled to hook shaft second end 177. Hook end 175 is perpendicular to hook shaft 174 in this embodiment, but this is not meant to be limiting. Hook end 175 forms the hook that grabs shopping cart 113. Hook end 175 extends from hook shaft second end 177 in a direction towards back plate bottom edge 134. Second and third cart coupling hooks 102 and 103 are similarly shaped.

Shopping cart bagging station 110 also includes three stabilizer bars 104, 105, and 106 coupled to and extending from back plate outer surface 132, see FIG. 4 and FIG. 12. First stabilizer bar 104 is coupled to and extends from back plate outer surface 132 of back plate 130. First stabilizer bar 104 is an elongate rod or bar with a stabilizer bar first end 183 and a stabilizer bar second end 184 opposing stabilizer bar first end 183. Stabilizer bar first end 183 is coupled to back plate outer surface 132. Stabilizer bar second end 184 has a stabilizer bar hole 197 through stabilizer bar second end 184, see FIG. 12. First stabilizer bar 104 extends from back plate 130 in a direction perpendicular to back plate 130. A connecting bar 107 extends along back plate outer surface 132 between first cart coupling hook 101 and first stabilizer bar 104. First connecting bar 107 is an elongate member of rigid material coupled to and extending flush with back plate outer surface 134, see FIG. 12. First connecting bar 107 has a connecting bar first end 185 coupled to hook shaft first end 176. First connecting bar 107 has a connecting bar second end 186 opposing connecting bar first end 185. Connecting bar second end 186 is coupled to first stabilizer bar first end 183

When shopping cart bagging station 110 is hung from shopping cart 113, first stabilizer bar 104 extends through side 111 of shopping cart 113 to stabilize shopping cart bagging station 110, keeping shopping cart bagging station 110 from rocking on shopping cart 113. First stabilizer bar 104 has stabilizer bar hole 197 stabilizer bar second end 184. Stabilizer bar hole 197 can be used to hang items from or to tie or couple shopping cart bagging station 110 to shopping cart 113 or another item. Connecting bar 107 extends along back plate outer surface 132 between first cart coupling hook 101 and first stabilizer bar 104, which adds strength and stability to cart coupling hook 101, first stabilizer bar 104, and back plate 130.

Similarly, second stabilizer bar 105 and third stabilizer bar 106 are coupled to and extend from back plate outer surface 132 of back plate 130. Second and third stabilizer bars 105 and 106 extend from back plate 130 in a direction perpendicular to back plate 130. A connecting bar 108 extends along back plate outer surface 132 between second cart coupling hook 102 and second stabilizer bar 105. A connecting bar 109 extends along back plate outer surface 132 between third cart coupling hook 103 and third stabilizer bar 106. Second and third stabilizer bars 105 and 106 extend through side 111 of shopping cart 113 to stabilize shopping cart bagging station 110, keeping shopping cart bagging station 110 from rocking on shopping cart 113.

Second and third stabilizer bars 105 and 106 each have a stabilizer bar hole 197 in their respective distal ends (the end away from back plate 130). Stabilizer bar hole 197 can be used to hang items from or to tie or couple shopping cart bagging station 110 to shopping cart 113 or another item. Connecting bar 108 extends along back plate outer surface 132 between second cart coupling hook 102 and second stabilizer bar 105, adding strength and stability to cart coupling hook 102, second stabilizer bar 105, and back plate 130. Connecting bar 109 extends along back plate outer surface 132 between third cart coupling hook 103 and third stabilizer bar 106, adding strength and stability to cart coupling hook 103, third stabilizer bar 106, and back plate 130.

Figure 13:
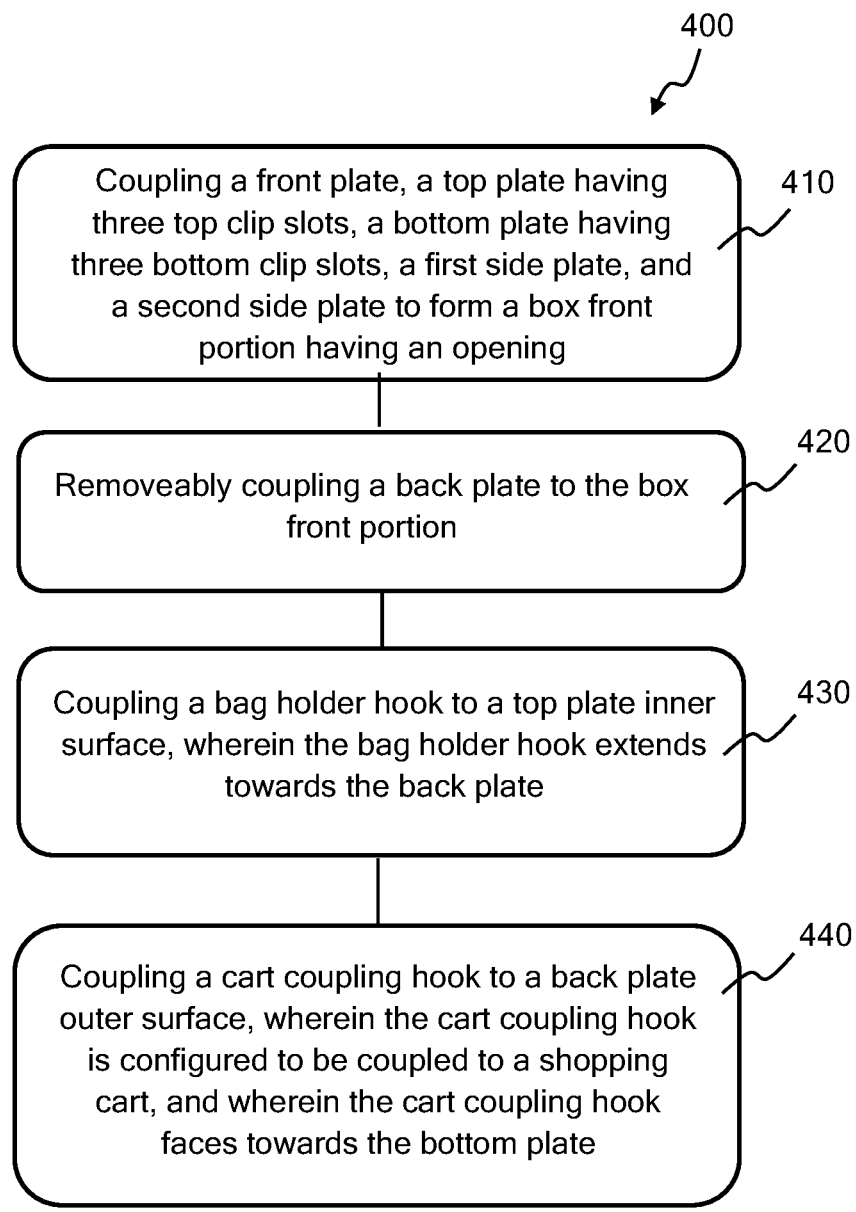
FIG. 13 illustrates a method of assembling a shopping cart bagging station.

FIG. 13 illustrates a method 400 of assembling a shopping cart bagging station. Method 400 includes an act 410 of coupling a front plate, a top plate having three top clip slots, a bottom plate having three bottom clip slots, a first side plate, and a second side plate together to form a box front portion having an opening. The opening extends through part of the front plate the top plate and first and second side plates. In some embodiments, the top plate is smaller than the bottom plate. In some embodiments, the first side plate has a first side curved edge. In some embodiments, the second side plate has a second side curved edge.

Method 400 includes an act 420 of removeably coupling a back plate to the box front portion. The back plate includes three top locking clips that extend through the three top clip slots. The back plate also includes three bottom locking clips that extend through the three bottom clip slots. The three top locking clips and the three bottom locking clips couple the back plate to the box front portion.

Method 400 includes an act 430 of coupling a bag holder hook to a top plate inner surface. The bag holder hook extends towards the back plate. The bag holder hook holds at least one shopping bag by putting the bag holder hook through the shopping bag hanger hole. The at least one shopping bag hangs from the bag holder hook.

Method 400 also includes and act 440 of coupling a cart coupling hook to a back plate outer surface. The cart coupling hook is configured to be coupled to a shopping cart, and the cart coupling hook faces towards the bottom plate.

Method 400 can include many other acts. In some embodiments, method 400 includes coupling a first and a second handle holder hook to the top plate inner surface on either side of the bag holder hook. In some embodiments, the bag holder hook, the first and the second handle holder hook all face towards the back plate. In some embodiments, the bag holder hook faces toward the back plate, and the first and the second handle holder hook face toward the front plate. In some embodiment, method 400 includes coupling at least one stabilizer bar having a stabilizer bar hole to the back plate outer surface.

A shopping cart bagging station has been shown and described that provides a bagging station for retail store customers to use to bag their purchases while they shop. The shopping cart bagging station includes an enclosure formed of a box front portion with a removable back plate. A bag holder hook and, in some embodiments, one or more handle holder hook, is hung from an inner surface of the top plate. The bag holder hook holds and dispenses shopping bags. Shopping bags hung from the bag holder hook are partially enclosed by the box front portion and the back plate. The handle holder hooks can be used to hang shopping bag handles from. The box front portion has an opening for reaching into the box front portion to load shopping bags onto the bag holder hook or to retrieve shopping bags from the bag holder hook. The shopping cart bagging station has one or more cart coupling hook that couple the shopping cart bagging station to a shopping cart. The shopping cart bagging station, with at least one shopping bag hung from the bag holder hook, can be used by a customer to dispense shopping bags while the customer shops. The shopping cart bagging station allows customers to bag their purchased items themselves instead of having to visit a checkout station.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:
1. A shopping cart bagging station comprising:
 a box front portion comprising:
  a front plate;
  a top plate having at least one top clip slot;
  a bottom plate, wherein the bottom plate comprises at least one bottom clip slot and wherein the top plate is smaller than the bottom plate;
  a first side plate having a first side curved edge; and
  a second side plate having a second side curved edge;
 a back plate removeably coupled to the box front portion, wherein the back plate comprises at least one locking clip coupled to a back plate inner surface;
 an opening in the box front portion configured for removing at least one shopping bag from the shopping cart bagging station;
 at least one bag holder hook coupled to a top plate inner surface, wherein the at least one bag holder hook holds the at least one shopping bag, and wherein the at least one bag holder hook extends towards the back plate; and at least one cart coupling hook coupled to a back plate outer surface, wherein the at least one cart coupling hook couples the shopping cart bagging station to a shopping cart.

2. The shopping cart bagging station of claim 1, wherein the front plate, top plate, bottom plate, first side plate, and second side plate are formed as an integral structure.

3. The shopping cart bagging station of claim 1, wherein: the top plate comprises three top clip slots;
the back plate comprises three top locking clips coupled to the back plate inner surface adjacent a back plate top edge; and
each of the three top locking clips couple to one of the three top clip slots, thereby coupling the back plate to the top plate.

4. The shopping cart bagging station of claim 3, wherein the three top locking clips extend through the top plate from the top plate inner surface to a top plate outer surface.

5. The shopping cart bagging station of claim 1, wherein: the bottom plate comprises three bottom clip slots;
the back plate comprises three bottom locking clips coupled to a back plate inner surface adjacent a back plate bottom edge; and
each of the three bottom locking clips couple to one of the three bottom clip slots, thereby coupling the back plate to the bottom plate.

6. The shopping cart bagging station of claim 5, wherein the three bottom locking clips extend through the bottom plate from a bottom plate inner surface to a bottom plate outer surface.

7. The shopping cart bagging station of claim 1, wherein the shopping cart bagging station comprises two handle holder hooks coupled to the top plate inner surface on either side of the at least one bag holder hook.

8. The shopping cart bagging station of claim 7, wherein the at least one bag holder hook and the two handle holder hooks are J-hooks, and wherein the at least one bag holder hook and the two handle holder hooks all face the back plate.

9. The shopping cart bagging station of claim 7, wherein the at least one bag holder hook and the two handle holder hooks are J-hooks, and wherein the at least one bag holder hook faces the back plate, and the two handle holder hooks each face the front plate.

10. The shopping cart bagging station of claim 1, wherein the cart coupling hook faces towards the bottom plate.

11. The shopping cart bagging station of claim 1, further comprising a stabilizer bar extending from the back plate outer surface in a direction perpendicular to the back plate.

12. The shopping cart bagging station of claim 11, further comprising a connecting bar extending between the cart coupling hook and the stabilizer bar.

13. The shopping cart bagging station of claim 1, wherein the opening is larger than the front plate.

14. The shopping cart bagging station of claim 1, wherein the first side curved edge extends between a top plate front edge and a front plate top edge.

15. A method of assembling a shopping cart bagging station, the method comprising:
coupling a front plate, a top plate having three top clip slots, a bottom plate having three bottom clip slots, a first side plate, and a second side plate together to form a box front portion having an opening;
removeably coupling a back plate to the box front portion, wherein the back plate comprises three top locking clips that extend through the three top clip slots, and three bottom locking clips that extend through the three bottom clip slots;
coupling a bag holder hook to a top plate inner surface, wherein the bag holder hook extends towards the back plate; and
coupling a cart coupling hook to a back plate outer surface, wherein the cart coupling hook is configured to be coupled to a shopping cart, and wherein the cart coupling hook faces towards the bottom plate.

16. The method of claim 15, further comprising coupling a first and a second handle holder hook to the top plate inner surface on either side of the bag holder hook.

17. The method of claim 16, wherein the bag holder hook, the first and the second handle holder hook all face towards the back plate.

18. The method of claim 16, wherein the bag holder hook faces toward the back plate, and wherein the first and the second handle holder hook face toward the front plate.

19. The method of claim 16, further comprising coupling at least one stabilizer bar having a stabilizer bar hole to the back plate outer surface.

20. The method of claim 15, wherein:
the top plate is smaller than the bottom plate;
the first side plate has a first side curved edge; and
the second side plate has a second side curved edge.

* * * * *